May 23, 1972  G. K. SHERMAN  3,664,598
PILOT SUPPORT
Filed July 31, 1970  2 Sheets-Sheet 1
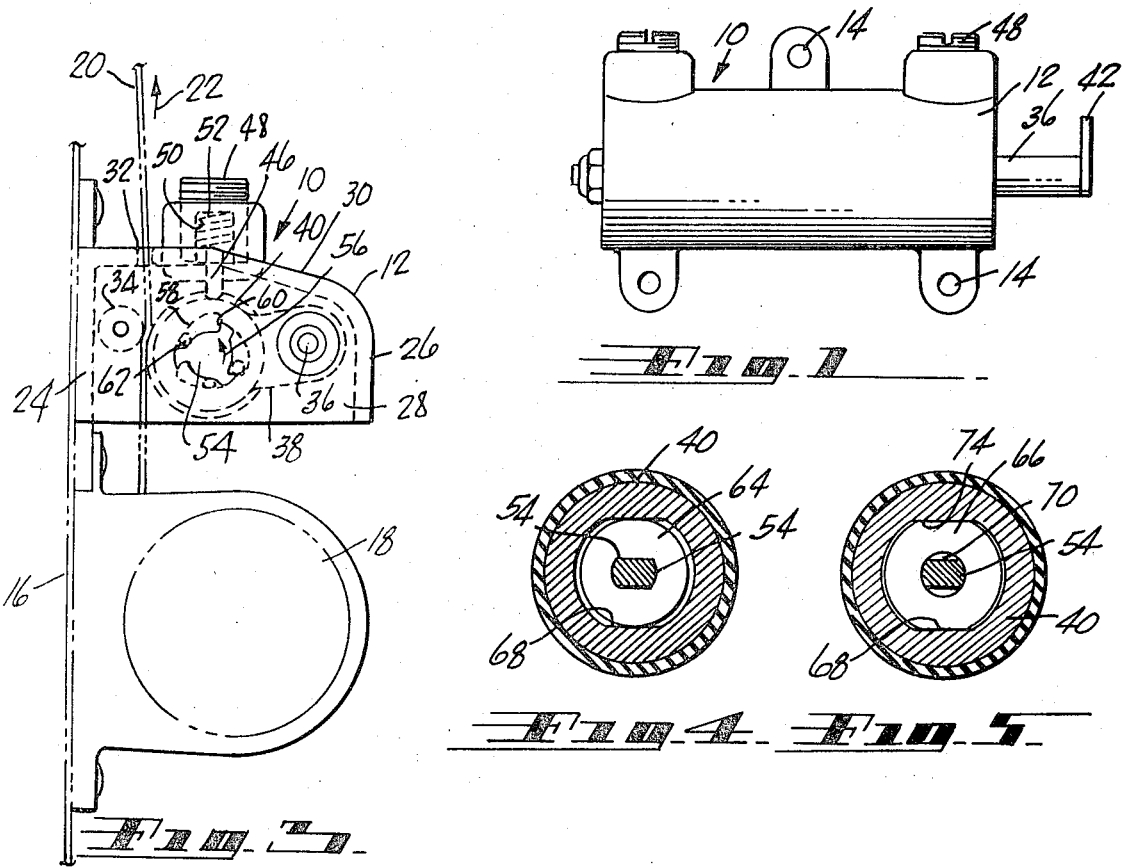
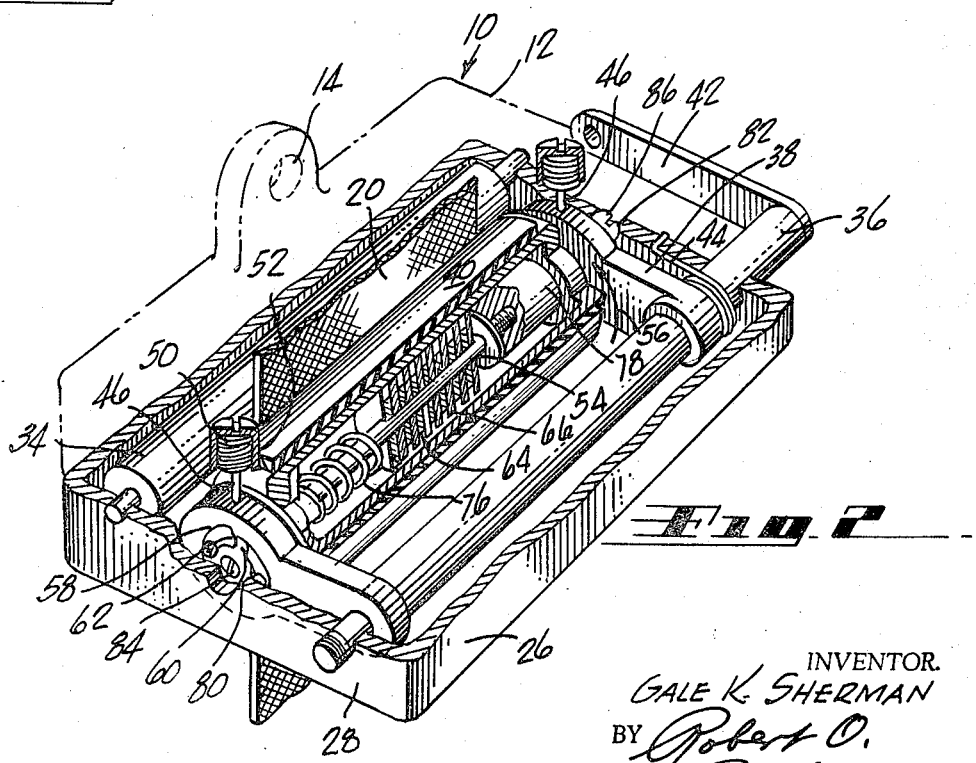
INVENTOR.
GALE K. SHERMAN
BY Robert O. Richardson
—ATTORNEY—

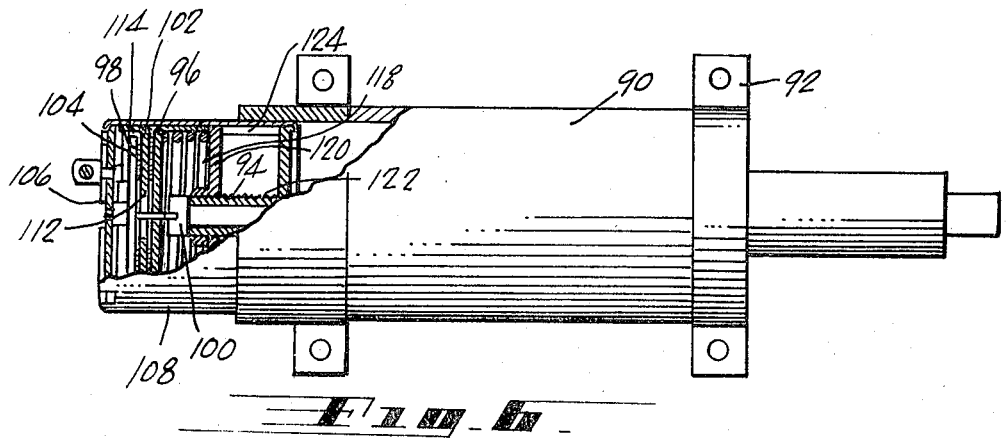
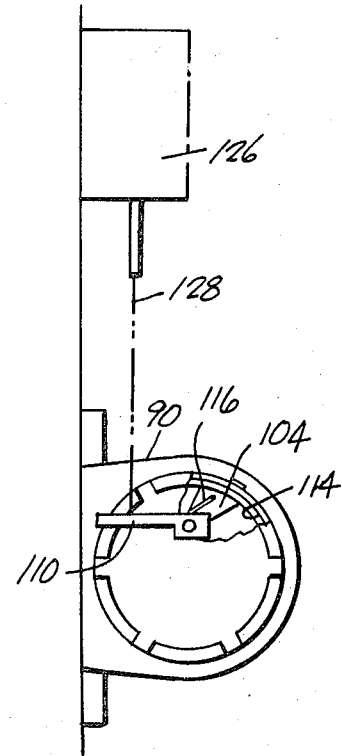

United States Patent Office 3,664,598
Patented May 23, 1972

3,664,598
PILOT SUPPORT
Gale K. Sherman, Tustin, Calif., assignor to McDonnell Douglas Corporation, Santa Monica, Calif.
Filed July 31, 1970, Ser. No. 59,883
Int. Cl. A62b 35/00
U.S. Cl. 242—107.3
6 Claims

ABSTRACT OF THE DISCLOSURE

An attachment providing drag on a shoulder harness strap sufficient to prevent an unconscious torso from slumping forward, yet not enough drag to prevent a conscious pilot from achieving normal reach. In one embodiment a friction clutch on an inertia reel is used and in another a friction clutch unit is positioned between the inertia reel and the occupant.

BACKGROUND OF THE PRESENT INVENTION

Both the pilot and copilot of an airline sits with a control column in front of him. When this control column is pushed forward, the airplane is placed in a dive. Should one of the pilots become incapacitated, such as by illness or a blow on the head by a skyjacker and his body tends to slump forward, contact is made with the control column, pushing it forward. Should this happen during critical times of takeoff and landing, all crew members are too busy to be of immediate help and the safety of the aircraft is impaired. For background purposes, an explanation of the operation of inertia reels is in order. The reels are equipped with a constant force spring which retracts the shoulder harness, rolling the strap onto the reel, as the seat occupant leans back, and, as the occupant leans forward he overcomes the spring force and the reel rotates, paying out the strap. The spring force is light— just enough force to roll the strap back onto the reel and to keep slack from developing. In event of the occupant being thrown forward, as in a crash, the inertia reel, being "G" sensitive, automatically locks and holds the pilot in position. The inertia reel will not prevent an unconscious body from slumping forward. It is possible to have an inertia reel with a manual lock, but pilots will not use it for takeoff and landing since it limits their reach at a time when they may have to reach something in a hurry.

A power haul-back approach has been considered in which the conscious pilot may push a button and a power reel would draw the shoulder harness taut to prevent the unconscious pilot from falling against the control column. This is not considered to be a satisfactory approach since the equipment is more expensive and it must reset after each use. Additional weight is also a factor.

SUMMARY OF THE PRESENT INVENTION

In one embodiment a restraint device for placing a drag on the shoulder harness is mounted between the inertia reel and the seat occupant while in another form the structure for inducing the drag is built into the inertia reel itself. In the first form, the shoulder harness strap passes between two rollers, one having a built-in brake to create a drag against rotation. The roller having the brake is keyed to an axle which is free to rotate in one direction but not in the other. In operation when the braking roller moves toward the idler roller, the harness strap comes into contact with both rollers. The braking roller is equipped with a cam action device so that when the seat occupant leans forward, pulling on the shoulder harness, the braking roller cam permits squeezing of the strap tightly between the idler roller and the braking roller. The strap may still pass between the two rollers but an increased load is required, depending upon the braking action of the braking roller. The braking roller is mounted on an axle which rotates in one direction only. As the seat occupant leans forward, the axle is locked but the roller rotates with a braking action. When the occupant leans back, the cam action device permits the grip of the strap between the two rollers to be relaxed, and the braking roller axle permits the roller to spin freely as the inertia reel retracts the harness strap. The device has no effect upon the inertia reel in its retraction operation but has an added load applied only when the occupant's body leans forward.

DETAILED DESCRIPTION OF THE DRAWINGS

FIG. 1 is a rear view of a pilot support for attachment between the inertia reel and the occupant;

FIG. 2 is a perspective view with parts broken away showing the operation of the support with a shoulder strap passing therethrough;

FIG. 3 is a side elevational view showing the relationship of the inertia reel shoulder straps and the support;

FIGS. 4 and 5 are sectional views of alternate sections of the clutch-brake mechanism;

FIG. 6 is an elevational view with parts broken away of the inertia reel with the support device added thereto; and FIG. 7 is a side elevational view.

Reference is now made to the embodiment shown in FIGS. 1 through 5, inclusive, wherein there is shown a restraint device 10 with housing 12 having a plurality of mounting apertures 14 for mounting the restraint device 10 to a seat structure 16 between the inertia reel 18 and the occupant, not shown. This inertia reel is of the type wherein the shoulder strap 20 is permitted to unwind and move in the direction of the arrow 22 to permit the occupant freedom of movement yet will lock the strap 20 from further unwinding upon either a sudden deceleration of the vehicle or a sudden accelerated pull on the strap 20. Either type of inertia reel is well-known in the art and further description thereof is not believed to be necessary.

The housing 12 consists of a back wall, front wall, and side walls 24, 26 and 28, and a top 30 having a longitudinal slot 32 therein to accommodate passage of the shoulder harness strap 20 under the control of the inertia reel 18. Rotatably mounted in the side walls 28 is an idler roller 34 and a roller pivot shaft 36. Affixed to rotate with the pivot shaft 36 are a pair of cam arms 38 between which is rotatably mounted a braking roller 40. Idler roller 34 preferably is of metal or plastic while the outer surface of the braking roller preferably is of a rubber material. Shoulder strap 20 passes between the two rollers. The position of the roller pivot shaft 36 and the cam arm 38 places the axis of braking roller 40 somewhat below the axis of the idler roller 34 such that the upward pull on shoulder strap 20 provides a wedging action of the two rollers against the strap. A roller release lever 42 affixed to the roller pivot shaft 36 may be used to disengage the braking roller 40, when desired, whereas spring 44 normally urges the braking roller into contact with the shoulder strap. When a load on strap 20 is not invoking a wedging action of the two rollers, an ejector pin 46 bears against cam arms 38 to disengage braking roller 40 from shoulder strap 20 for normal use. An adjusting screw housing 48 has an inner cavity 50 with a spring 52 therein which urges the ejector pin 46 downwardly against the cam arm 38.

The braking roller 40 has a built-in brake which creates a drag against rotation in a clockwise direction shown in the drawings. When the seat occupant leans forward and pulls on the shoulder strap 20, the strap is squeezed between the idler roller 34 and the braking roller 40. The strap may still pass between the two rollers but an increased load is required. The amount of load required is dependent upon the braking action of the rubber-covered roller 40. This function may be accomplished by providing that the shaft 54, on which the braking roller 40 is positioned, rotates only in a counterclockwise direction, as shown by arrow 56 in FIG. 2 and in FIG. 3. The braking roller 40 rotates in this direction along with shaft 54 as the shoulder strap 20 is retracted by the inertial reel 18. However, shaft 54 will not rotate in a clockwise direction but through a friction disc clutch arrangement, the braking roller 40 will rotate under a load condition on the shoulder strap 20.

The non-rotation in a clockwise direction of shaft 54 is accomplished through a ratchet arrangement between a ratchet surface 58 on cam arm 38 and ratchet arm 60 on the end of shaft 54, with locking balls 62 positioned in between. As in a conventional ratchet action, when the shaft 54 is rotated counterclockwise in the direction of arrow 56, the ratchet arms 60 push the balls 62 up the inclined ratchet surfaces 58 to permit rotation of the shaft 54 relative to the cam arm 38. However, when the shaft 54 is urged in a clockwise direction, such as by a load in the direction of arrow 22 on the shoulder harness 20, the ratchet arms jam the locking balls downwardly into the deeper recesses of the ratchet surfaces and stop rotation of the shaft 54 relative to the cam arm 38.

In order for shoulder strap 20 to move in the direction of arrow 22 under a load, there must be relative movement between the locked non-rotatable shaft 54 and the braking roller 40 which must rotate in a clockwise direction. This is accomplished by the friction disc arrangement best shown in FIGS. 2, 4 and 5. As can be seen in FIG. 2, a multiple of discs 64, 66 are alternately placed on shaft 54. Discs 64, shown in FIG. 4, are keyed to shaft 54 and are small enough not to engage the flats 68 on the braking roller 40. Discs 66, shown in FIG. 5, have large enough apertures 70 not to engage the flat surfaces of shaft 54. However, their outer surface edges 74 are keyed to the flats 68 of the roller 40 to rotate therewith.

As can be seen in FIG. 2, a lateral compression along the shaft 54 will cause discs 66 to frictionally engage the discs 64 when the braking roller 40 is rotating and shaft 54 is not rotating. This axial compression is caused by spring 76 positioned over shaft 54. Friction between the discs 64 and 66 may be made adjustable by adjusting the tension on spring 76. Shaft 54 threads into a brake adjustment element 78 which rotates within cam arm 38, shown on the right in FIG. 2. Relative rotational movement between this element and shaft 54 will provide relative longitudinal movement and thus an adjustment of the spring tension on spring 76. This relative rotational adjustment can be made by a pair of screwdrivers inserted into openings 80 and 82 in side walls 28 and into engagement with screw heads 84, 86.

An alternate embodiment is shown in FIGS. 6 and 7 wherein the additional drag may be induced on the inertial reel itself. Here there is shown a harness and reel assembly housing 90 having brackets 92 for appropriate mounting. This assembly permits a shoulder harness to be extended and retracted in normal use. Roller 94 is a rotating shaft upon which the harness shoulder strap is wound and unwound. A rotor drum 96 and drive disc 98 are rotatably mounted on an extension 100 of the inertial reel spool roller or shaft 94 and has a stator drum 102 positioned in between. The drive disc 98 and the rotor drum 96 have friction material faces for frictionally gripping the stator drum 102. All three discs rotate freely as a unit with the rotation of shaft 94, except when stator drum is locked in a non-rotating position to provide a frictional drag on the rotation of the spool 94. The locking of the stator drum 102 in a non-rotatable position is accomplished with a locking pawl 104 pivotally mounted on the end 106 of housing 108 and actuated by a lever 110. The stator drum consists of a disc portion 112 and an outer cylindrical flange 114. The pawl is urged by a spring 116 into contact with the inner wall of the cylindrical flange 114 and thus acts as a brake which binds itself more tightly against the outer cylindrical flange 114 as the harness strap is pulled outwardly from the reel housing 90. The friction and drag caused by the locked stator drum 102 while drive disc 98 and rotor drum 96 rotates while in frictional contact with the braked stator drum 102 is controlled by the tension of spring 118 applied against the rotor drum 96.

As an optional feature compensation is provided for lessening the tension on the spring 118 as the harness strap is extended from the housing 90. Inherently in the inertial reel as the harness strap is extended the diameter of the shoulder strap about shaft 94 diminishes, and a progressively greater force is necessary in the extending of the strap. As a compensation for this extra force, the tension on spring 118 is lessened in the optional embodiment by the provision of a compensator disc 120 which moves longitudinally along the shaft 94 as the shaft revolves. In this embodiment, shaft 94 has external threads 122 which move the compensator along the axis of the shaft 94 as it rotates. The compensator 120 does not rotate and is prevented from rotation by a key way 124. In the embodiment in which this pressure compensation feature is not desired, the compensator 120 may be simply spot-welded to the housing 108 and removed from its threaded contact with the shaft 94.

Lever 110 may be used to release the locking pawl 104, either manually or by control from a solenoid 126, through an appropriate connection, shown by phantom lines 128. Solenoid 126 may be actuated by an appropriate signal, such as upon the extension of the wing flaps, for example, or by the manual engagement of an appropriate switch, if desired.

From the foregoing description of the selected embodiments illustrating the present invention, it will become obvious that other modifications may be made and it is to be understood that these variations are to be considered as part of the present invention, as claimed.

I claim:

1. A restraint device including a roller having a strap movably associated therewith,
    drag means for providing a frictional drag on said roller when rotated in one direction, said frictional drag being reduced upon rotation of said roller in the other direction,
    said drag means including a plurality of friction clutch plates alternate ones of which rotate in frictional engagement with adjacent plates selectively made non-rotatable,
    bias means exerting a frictional force between adjacent plates,
    one of said friction clutch plates including a drive disc rotatable with said roller, another of said plates including a stator drum selectively rotatable with said rotor drum and non-rotatable therewith as desired, and
    pawl means selectively engageable with said stator drum to prevent rotation thereof in one direction while permitting rotation thereof in the other, 2. A restraint device as in claim 1 wherein said bias means exerts a variable force between said adjacent plates.

3. A restraint device as in claim 1 wherein said drag means includes an idler roller and a braking roller between which said strap is adapted to pass,
    said braking roller having a shaft upon which it rotates,
    said shaft having said plurality of friction clutch plates thereon, alternate ones of which rotate with said shaft and alternate ones of which rotate with said braking roller,
    said bias means including spring means urging said discs in frictional contact for simultaneous movement, and
    means limiting said shaft to rotation in one direction only thereby placing a drag on said braking roller when rotated in the opposite direction.

4. A restraint device as in claim 3 wherein said braking roller shaft is pivotally mounted for relative placement with said idler roller for engagement and release of said strap therebetween.

5. A restraint device as in claim 1 in combination with a shoulder strap inertia reel which permits unwinding movement of said strap and automatic rewinding of said strap by said reel in the absence of tension thereon.

6. A restraint device as in claim 1 wherein said stator drum includes a disc portion having frictional engagement with said drive disc for rotation with said roller, said stator drum also including a cylindrical flange, said pawl means being urged into contact with said cylindrical flange to act as a brake binding itself more tightly against said flange as said roller is rotated.

References Cited

UNITED STATES PATENTS

| | | | |
|---|---|---|---|
| 11,067 | 3/1890 | Griswold | 242—107.3 |
| 3,178,225 | 4/1965 | Bayer | 297—386 |
| 2,896,912 | 7/1959 | Faugier et al. | 242—107.3 X |
| 3,058,687 | 10/1962 | Bentley | 242—107.4 |
| 3,059,727 | 10/1962 | Fuchs | 188—83 X |
| 3,182,962 | 5/1965 | Gray | 242—99 X |
| 3,442,466 | 5/1969 | Fritsche | 242—107.4 |

WERNER H. SCHROEDER, Primary Examiner

U.S. Cl. X.R.

242—107.4; 244—122